US008623262B2

(12) United States Patent
Jung et al.

(10) Patent No.: US 8,623,262 B2
(45) Date of Patent: Jan. 7, 2014

(54) METHOD, SYSTEM AND MOLDING TOOL FOR MANUFACTURING COMPONENTS FROM COMPOSITE FIBER MATERIALS

(75) Inventors: Manuel Jung, Fredenbeck (DE); Michael Bechtold, Mönsheim (DE)

(73) Assignee: Airbus Operations GmbH (DE)

( * ) Notice: Subject to any disclaimer, the term of this patent is extended or adjusted under 35 U.S.C. 154(b) by 104 days.

(21) Appl. No.: 13/140,152

(22) PCT Filed: Nov. 24, 2009

(86) PCT No.: PCT/EP2009/065712
§ 371 (c)(1),
(2), (4) Date: Jul. 13, 2011

(87) PCT Pub. No.: WO2010/072495
PCT Pub. Date: Jul. 1, 2010

(65) Prior Publication Data
US 2012/0003480 A1    Jan. 5, 2012

Related U.S. Application Data

(60) Provisional application No. 61/201,915, filed on Dec. 16, 2008.

(30) Foreign Application Priority Data

Dec. 16, 2008    (DE) .......................... 10 2008 062 477

(51) Int. Cl.
*B32B 5/26*    (2006.01)
(52) U.S. Cl.
USPC ........... 264/335; 264/257; 264/314; 264/334; 264/45.2; 249/63; 249/64; 249/175; 249/176; 249/177; 249/178; 249/179; 156/175; 156/245; 156/416

(58) Field of Classification Search
USPC ........................ 264/257, 314, 334, 335, 45.2; 249/63–64, 175–179, 183; 156/175, 156/245, 416
See application file for complete search history.

(56) References Cited

U.S. PATENT DOCUMENTS 3,832,109 A * 8/1974 Ranallo et al. ................ 425/112
4,061,310 A   12/1977 Vetter
(Continued)

FOREIGN PATENT DOCUMENTS

CN    2701616 Y    5/2005
DE    756995 C     9/1952
(Continued)

*Primary Examiner* — Monica Huson
*Assistant Examiner* — Saeed Huda
(74) *Attorney, Agent, or Firm* — Lerner, David, Littenberg, Krumholz & Mentlik, LLP

(57) ABSTRACT

In a method for manufacturing components from composite fiber materials, at least one placeholder is inserted into a recess in a molding tool, wherein the unfinished component is subsequently produced, the placeholder is removed, at least one lifting pad is inserted into the recess and the unfinished component is removed from the molding tool by inflating the lifting pad. In a system for manufacturing components from composite fiber materials, the component removal process is monitored and controlled by a computer unit in order to prevent predetermined maximum component loads from being exceeded. The gentle component removal process makes it possible to avoid consequential costs for repairing or reworking the components.

7 Claims, 4 Drawing Sheets

(56) References Cited

U.S. PATENT DOCUMENTS

| | | | | |
|---|---|---|---|---|
| 4,780,170 | A * | 10/1988 | Landsness | 156/416 |
| 6,394,396 | B2 * | 5/2002 | Gleine et al. | 244/198 |
| 6,536,714 | B2 * | 3/2003 | Gleine et al. | 244/214 |
| 2007/0126155 | A1 * | 6/2007 | Korwin-Edson et al. | 264/333 |
| 2008/0251409 | A1 | 10/2008 | Hessemer | |
| 2012/0024455 | A1 * | 2/2012 | De Mattia et al. | 156/62.2 |
| 2012/0024468 | A1 * | 2/2012 | Chaume et al. | 156/243 |

FOREIGN PATENT DOCUMENTS

| | | |
|---|---|---|
| DE | 1280549 B | 10/1968 |
| DE | 1286741 B | 1/1969 |
| DE | 19854735 A1 | 5/2000 |
| EP | 1231046 A2 | 8/2002 |
| JP | 09193252 A | 7/1997 |
| WO | 2008/133748 A2 | 11/2008 |

* cited by examiner

METHOD, SYSTEM AND MOLDING TOOL FOR MANUFACTURING COMPONENTS FROM COMPOSITE FIBER MATERIALS

CROSS REFERENCE TO RELATED APPLICATIONS

This application is a national phase entry under 35 U.S.C. §371 of International Application No. PCT/EP 2009/065712, filed Nov. 24, 2009, published in German, which claims the benefit of the filing date of U.S. Provisional Patent Application No. 61/201,915, filed Dec. 16, 2008, and of German Patent Application No. 10 2008 062 477.2, filed Dec. 16, 2008, the entire disclosures of which are hereby incorporated herein by reference.

TECHNICAL FIELD OF THE INVENTION

The invention pertains to a method for manufacturing components from composite fiber materials, a system for manufacturing components from composite fiber materials, a molding tool for the manufacture of components from composite fiber materials, a use, as well as an aircraft comprising components that were manufactured with the method according to the invention.

BACKGROUND OF THE INVENTION

In the manufacture of components from fiber-reinforced plastics by means of molding tools—whether male or female molding tools—it is unlikely for the component to separate from the molding tools by itself after the hardening process. It is therefore necessary to carry out a manual component removal. The term "component removal" refers to the removal of the hardened component from the mold. According to the current state of the art, this is realized by lifting the component on the component edge by means of wedge tools, wherein these wedge tools may consist, for example, of wood or a soft plastic such as, for example, polytetrafluoroethylene.

With larger components, it is furthermore required to "readjust" the wedge tools before the component completely separates from the mold. Particularly with large-surface shell components, for example, in the form of wings, aircraft fuselage shells, solar panels and the like, the wedge tools needs to be driven very far in the direction of the component center before the component ultimately separates from the mold.

If the molding tools are insufficiently or incorrectly coated with a releasing agent and the component has very large dimensions with inferior accessibility, it may be necessary to utilize other mechanical devices with a greater leverage effect for separating the component. The manual use of such mechanical devices may also be required if the component geometry sectionally comprises a slight undercut.

DE 198 54 735 A shows a bushing made of thermally deformable as well as a method for producing the such. The bushing consists of a substantially pipe-shaped base body with a cylindrical outer circumference with a substantially constant radius and an inner cylindrical circumference that is tapered in axial direction.

DE 756 995 shows a pressing mold for processing curable compressed laminated material, from which mold the pressed component is removable by means of compressed air.

Molding tools with so-called "sliding inserts" cannot be used for components with high surface requirements such as, e.g., aerodynamic surfaces or functional surfaces of an aircraft that are subject to strict tolerances. The reasons for this are, for example, the facts that the wedge tools may be outlined on the component surface, that so-called "lugs" may be created in the matrix material and that it is difficult to produce a seal against resin during the component hardening.

SUMMARY OF THE INVENTION

Accordingly, it may be the object of the invention to propose a method for manufacturing components from composite fiber materials that diminishes or entirely eliminates at least a few of the above-described disadvantages. An object may consist, in particular, of proposing a method of this type, in which large-surface components can also be carefully removed from a mold without damaging a component surface, creating projections or generally subjecting the component to excessive mechanical loads.

This object may be met with a method for manufacturing components from composite fiber materials, a system for manufacturing components from composite fiber materials, a molding tool for manufacturing components from composite fiber materials, a use of such a tool, as well as an aircraft comprising a component according to the independent claims. Different exemplary embodiments of the present invention are described in the dependent claims.

According to one important aspect of the method to the invention, a component molded by laying and laminating fiber material in a molding tool and subsequently hardening the component is not removed from the molding tool by means of wedge tools or other tools that significantly intervene mechanically, but rather with inflatable lifting pads. Accordingly, the invention is characterized in that a much more controllable removal method is used. Due to the use, for example, of pneumatically controlled lifting pads, the force or the path during the removal can be controlled such that a largely careful separation of the component from the molding tool is ensured.

In a first concept of the method according to the invention, a molding tool is used that comprises a recess for a lifting pad on the future component edge. In order to preserve the surface, a placeholder is inserted into this recess before laying and laminating the component in the molding tool, wherein said placeholder completely fills out the recess and ends flush with the surface of the molding tool. In this case, the placeholder may consist of one part or be realized in the form of a multipart laminate.

Depending on the surface requirements of the component, the recess should lie in a region outside the actual component, namely in a so-called "trimming region." The component to be manufactured extends into this trimming region that lies outside the desired final shape. After hardening and removing the component from the molding tool, the component can be trimmed to its final shape within the trimming region. This is particularly sensible because it cannot be guaranteed that the recess actually ends flush with the surface of the molding tool such that no edge, no bend and no slight undulation can be detected in the resulting component when the recess is filled with a placeholder. Since the trimming region does not remain on the component in any case, a slight shape deviation in this region is not critical.

The recess in the molding tool preferably extends outward from the trimming region such that an overlap exists between the trimming region and the recess. This makes it possible to remove the placeholder from the recess once the component has been laid, laminated and hardened.

As soon as the component is present in the molding tool in its unfinished state—i.e., not yet trimmed to its final shape and also referred to as "unfinished component" below—the placeholder can be removed such that a cavity with an outward opening is created underneath a section of the trimming region. A lifting pad that consists of an elastic material and is expanded by being filled with compressed air or another suitable medium can be inserted into this opening. In comparison with known wedge tools, this results in a very large-surface force application such that no punctiform, one-sided load application, local bending or other load peaks are created. The force application is well defined such that the limits with respect to the mechanical stability, e.g., a predetermined elastic line, are not exceeded due to the removal from the mold, particularly with thin-shell, large-surface components or component sections. This results in a reduction of visible or invisible damages to the composite fiber material such that elaborate additional inspection steps for ensuring the integrity of, in particular, safety-relevant components can also be reduced. In this way, the costs directly associated with the manufacture of the component are lowered.

The final removal of a larger component can be ensured by subsequently inserting and inflating other lifting pads. Once the first lifting pad has been sufficiently inflated in the recess in order to slightly lift the component out of the molding tool, another lifting pad can be inserted into the additional hollow space or intermediate space created underneath the component.

A maximum permissible elastic line of the component can be calculated from the component dimensions. This elastic line is not exceeded due to corresponding dimensions of the lifting pad. A system for manufacturing components from composite fiber materials preferably may comprise an automatic control of several lifting pads with a correspondingly programmed computer unit or another electronic apparatus that controls and monitors the component removal process.

Depending on the component geometry and the respective requirements, it would be possible to use lifting pads with especially shaped geometries. This promotes the removal, in particular, of components with slight undercuts.

In component regions, in which an opening is produced or a geometric region is removed in another manufacturing step, lifting pads of temperature-resistant materials can already be used prior to the lamination of the component. In this case, it needs to be ensured that the molding tool is provided with a preinstalled connection for the medium to be supplied into the integrated lifting pad, and that the lifting pad is placed into the molding tool in such a way that no resin can pass between the molding tool and the lifting pad. Such preinstalled lifting pads that are distributed over the surface of the component to be manufactured would make it possible to implement a fully automated component removal in a series production process. A central control on the molding tool may control and inflate the lifting pads such that the component is removed as carefully as possible.

In addition to open molding tool concepts with male or female molding tools, the method according to the invention may also be used in connection with closed tool concepts such as, e.g., in resin injection methods ("Resin Transfer-Molding," RTM). In this case, the size of the lifting pads may be reduced such that they form knob-like lifting pads or lifting knobs. The component may be completely removed in a largely automated fashion, namely in the sense of a series production, by controlling several smaller integrated lifting knobs.

All in all, the method according to the invention for manufacturing components from composite fiber materials provides a few advantages in comparison with known manufacturing methods, in which the components are conventionally removed in a manual fashion. For example, the path and the force during the removal process may be controlled such that unnecessary bending stress on the component may be prevented. Likewise, the risk of damaging the component during the removal is also reduced because a predefined maximum elastic line can be observed. In this way, the number of repairs required on components damaged during the removal process is reduced. Highly critical components such as, for example, solar cell panels of satellites can be carefully removed from the mold with the proposed method, in particular, because no punctiform load application occurs during the removal process. The surface load during the removal process can be adapted to special component geometries with the concrete design of the lifting pad. An automation is possible in order to save costs and time. If the component to be removed is very rigid or very stiff, the method according to the invention also makes it possible to apply significantly higher forces than currently known manual removal processes. If the lifting pads are connected in parallel, it is ultimately also possible to simultaneously lift several component regions such that the local bending stresses are reduced.

The object of the invention is also met by a molding tool for manufacturing components from composite fiber materials that comprises at least one recess, into which a lifting pad can be inserted underneath the component to be manufactured, within a trimming region. The object is furthermore attained with a use of such a molding tool, as well as an aircraft that comprises at least one component manufactured with the method according to the invention.

It should be noted that characteristics and secondary effects of the present invention were described with reference to different embodiments of the invention. Other characteristics, advantages and possible applications of the present invention result from the following description of exemplary embodiments and the figures. In this respect, all described and/or graphically illustrated characteristics form the object of the invention individually and in this combination, namely regardless of their composition in the individual claims or their references to other claims.

BRIEF DESCRIPTION OF THE FIGURES

In the figures, identical or similar objects are identified by the same reference symbols.

DETAILED DESCRIPTION OF THE DRAWINGS

Figure 1A:
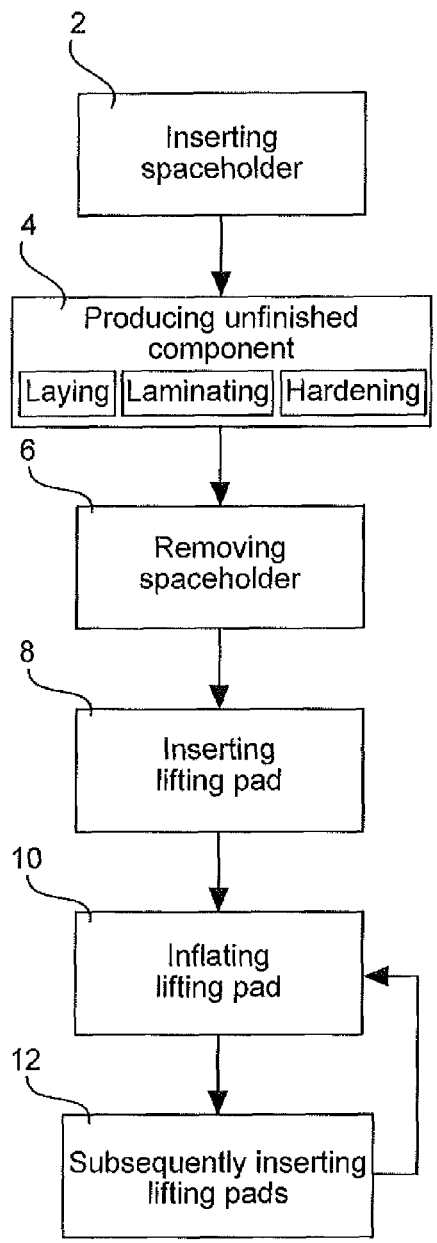
FIG. 1a shows a schematic overview of a first variation of the method according to the invention.

FIG. 1a shows a first concept of the manufacturing method according to the invention. In this exemplary embodiment, the method according to the invention begins with the step of inserting 2 placeholders into the corresponding recesses of the molding tool. Subsequently, the step of producing 4 the unfinished component is carried out. This step usually consists of the individual processes laying, laminating and hardening, however, without claiming completeness and correctness of the sequence in this respect. The state of the art contains numerous different procedures for the production of an unfinished component from composite fiber materials such as, for example, the manual laying of fibers, manual laminating and subsequent hardening, as well as mechanized laying and resin injection methods.

The placeholders are removed 6 after the unfinished component has been produced. As already mentioned in the introduction to the description, a recess is situated in the molding tool underneath a trimming region after removing 6 the space holders. A lifting pad may be inserted 8 into this recess and subsequently inflated 10. The inflation 10 should preferably take place in a controlled fashion such that excessive bending loads on the component can be prevented. It is particularly preferred to inflate 10 the lifting pads incrementally and to subsequently insert 12 and likewise inflate 10 additional lifting pads in the thusly created intermediate spaces between the component and the molding tool. Due to this successive procedure, the component is carefully removed from the molding tool.

Figure 1B:
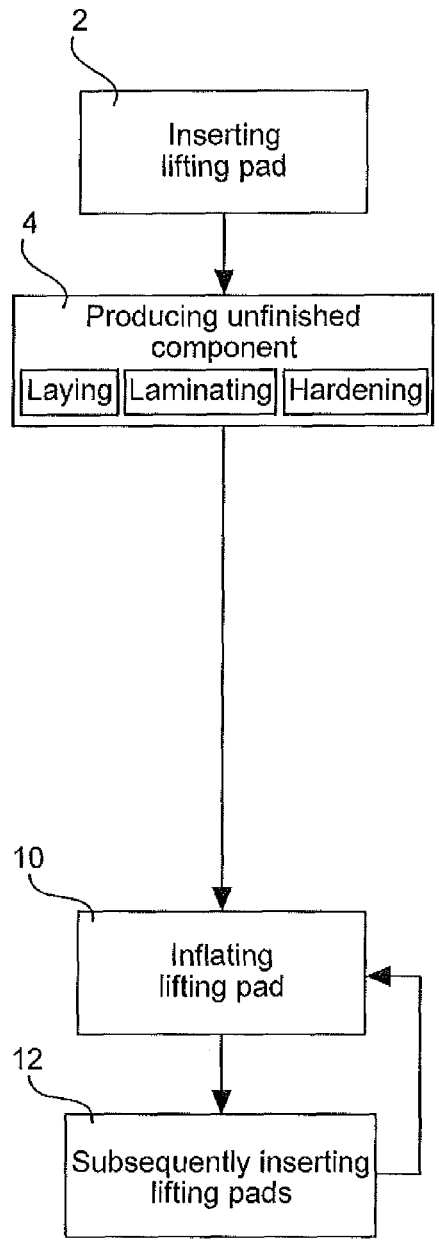
FIG. 1b shows a schematic overview of a second variation of the method according to the invention.

A second exemplary embodiment of the method according to the invention is illustrated in FIG. 1b. The method according to FIG. 1b may be carried out alternatively or additionally to the method illustrated in FIG. 1a. For example, larger components can be regionally manufactured by using the method according to FIG. 1a and in other regions by utilizing the method according to FIG. 1b, e.g., if openings occur only in a region of the component.

In this case, lifting pads are already inserted 8 prior to the production of the unfinished component 4, for example, into regions of the molding tool, in which opening geometries or other geometry interruptions are produced. This means that the lifting pad or the lifting pads lie in regions, in which no surface subsequently exists, such that possible bends, folds, undulations or the like are irrelevant. In this context, it is particularly important that the inserted lifting pads have a temperature resistance that makes it possible to introduce the lifting pad into a hardening device between the component and the molding tool. The hardening process may be carried out, for example, at a temperature that lies slightly below 200° C. such that the lifting pads for the method according to the invention, according to the second exemplary embodiment need to have a correspondingly high temperature resistance. It furthermore needs to be observed that the molding tool comprises connections for a medium to be supplied to the lifting pad such as, for example, compressed air connections.

After the production of the unfinished component 4, the lifting pads are inflated 10, wherein additional lifting pads are subsequently inserted 12 into the intermediate spaces or hollow spaces created between the component and the molding tool and subsequently also inflated 10. In this way, the successive lifting process by means of inflated lifting pads described with reference to FIG. 1a is also realized in this case.

Figure 2:
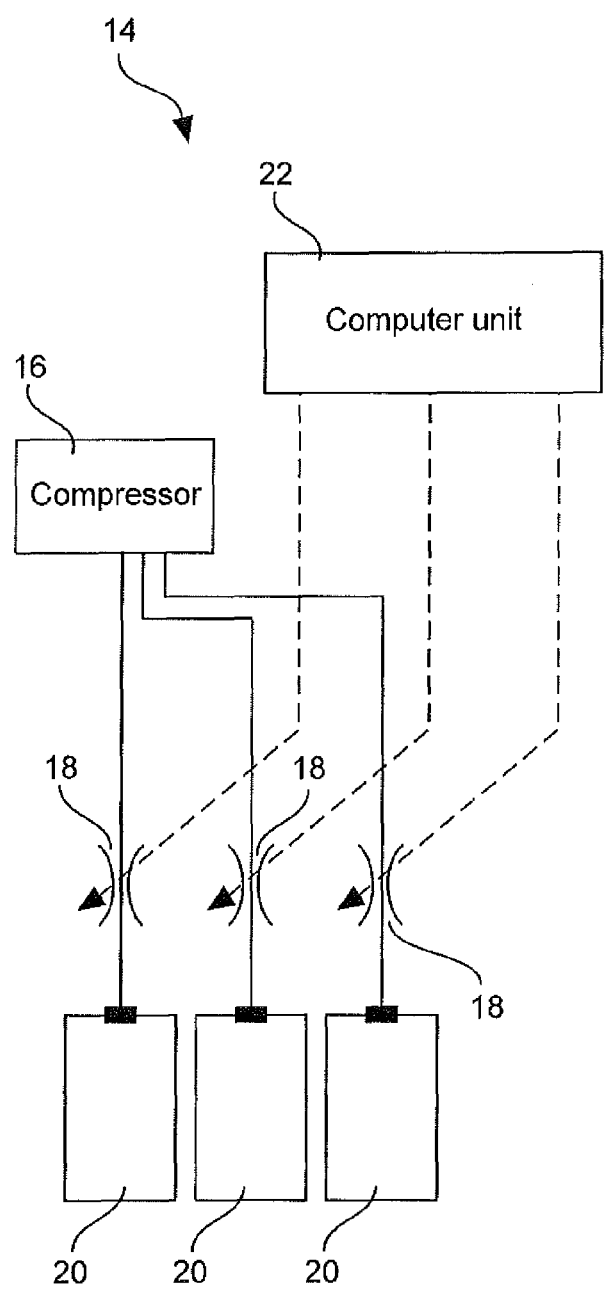
FIG. 2 illustrates a system, according to an embodiment of the invention, for manufacturing a component from composite fiber materials.

FIG. 2 shows one potential system according to the invention for manufacturing a component from composite fiber materials 14, wherein said system comprises a fluid source in the form of a compressor 16 that is connected to lifting pads 20 via valves 18. Individual lifting pads or a combination of the lifting pads 20 shown can be selectively inflated by adjusting the flow resistance or the like of the individual valves 18. The illustration in FIG. 2 should be interpreted in an exemplary fashion, wherein any number of lifting pads 20 or the lifting knobs mentioned in the introduction to the description may be utilized, namely in dependence on the size of the component to be manufactured, its complexity, undercuts or the like. In order to achieve the most effective component protection possible, it would be conceivable to utilize a computer unit 22 that monitors and controls the entire component removal process. For example, the computer unit 22 may control the inflation of the individual lifting pads 20 independently of one another in order to automatically prevent the predetermined maximum elastic line of the component from being exceeded.

Figure 3:
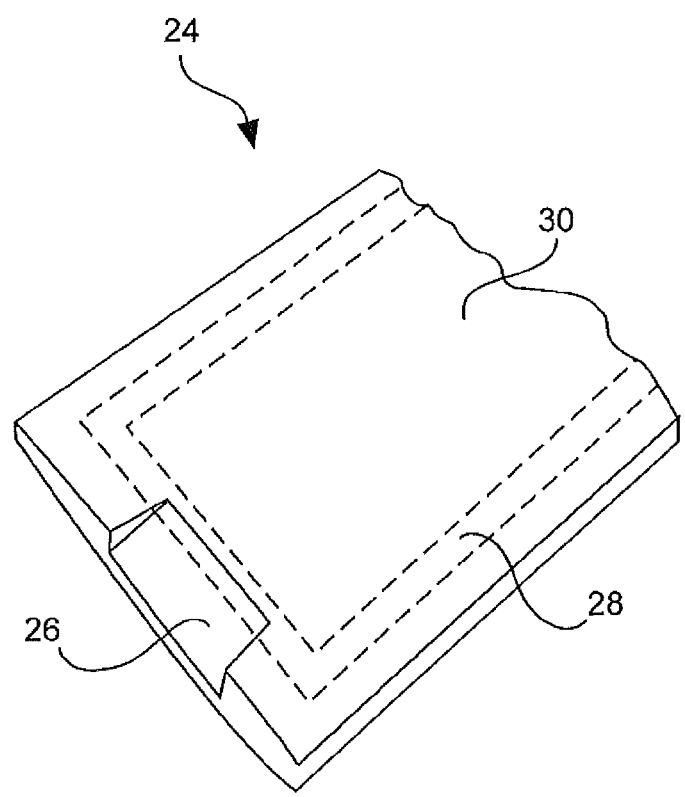
FIG. 3 shows a schematic representation of a molding tool according to the invention.

FIG. 3 shows an exemplary molding tool 24 that comprises, for example, a recess 26 for inserting a lifting pad 20. It should be clear to a person skilled in the art that the molding tool 24 may comprise a significantly larger number of recesses 26. The region 28 illustrated with broken lines in FIG. 3 represents the so-called trimming region, into which the component being manufactured extends, wherein this trimming region is trimmed after the component has hardened in order to provide the component with its final shape. It is obvious that a lifting pad can be inserted into the recess 26 when a component still lies flush on the surface 30 of the molding tool 24. Part of the component can separate from the surface 30 of the molding tool 24 in the region of the recess 26 when a lifting pad is inflated within the recess 26 such that other lifting pads can be inserted between the surface 30 of the molding tool 24 and the component.

Figure 4:
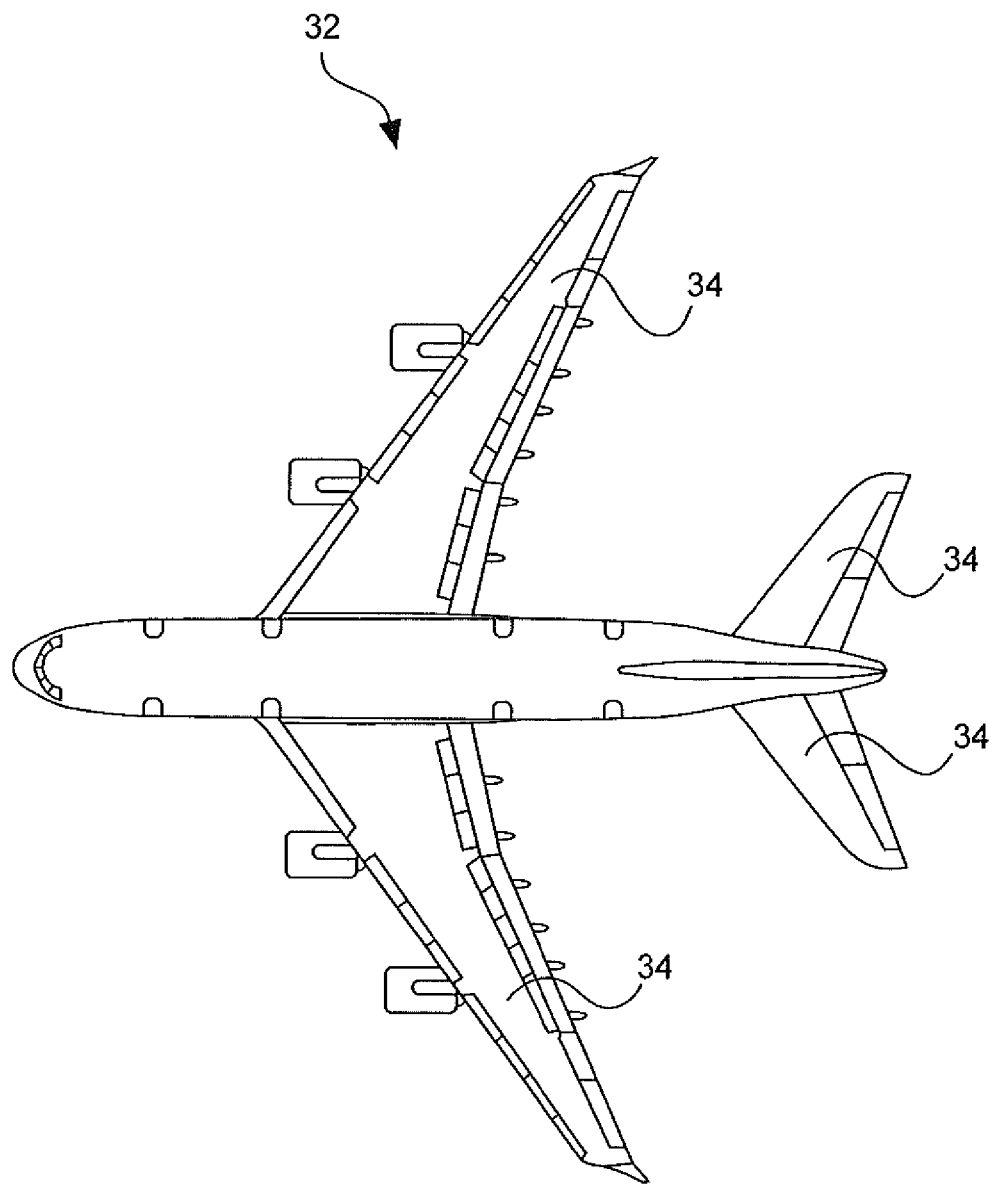
FIG. 4 shows an aircraft that comprises components manufactured with the method according to the invention.

FIG. 4 shows an examplary aircraft 32 with several components 34 that were manufactured with the method according to the invention, on the molding tool 24 according to the invention and by the use of a system 14 according to the invention.

It should be noted that "comprising" does not exclude other elements or steps, and that "a" or "an" does not exclude a plurality.

REFERENCE SYMBOLS

2 Inserting placeholders
4 Producing unfinished component
6 Removing placeholders
8 Inserting lifting pads
10 Inflating lifting pads
12 Subsequently inserting lifting pads
14 System according to the invention
16 Compressor
18 Valve
20 Lifting pad
22 Computer unit
24 Molding tool
26 Recess
28 Trimming region
30 Surface of molding tool
32 Aircraft
34 Component

The invention claimed is:

1. A method for manufacturing components from composite fiber materials, comprising:
    inserting at least one placeholder for a lifting pad into at least one respective recess in a molding tool;
    producing an unfinished component;
    removing the placeholder;
    inserting at least one lifting pad into the at least one recess; and
    removing the unfinished component from the mold by inflating the at least one lifting pad.

2. The method of claim 1, comprising the additional steps of subsequently inserting at least one other lifting pad and inflating the at least one other lifting pad.

3. The method of claim 1, in which the at least one lifting pad is inserted prior to the production of the unfinished component.

4. The method of claim 1, in which the at least one lifting pad is only inflated to such a degree that an elastic line of the unfinished component does not exceed a predetermined permissible elastic line.

5. The method of claim 1, in which a computer unit controls the inflation of a plurality of lifting pads by means of valves.

6. The method of claim 5, in which the computer unit controls the inflation of the lifting pads in dependence on the elastic line of the unfinished component.

7. The method of claim 1, wherein the at least one recess is in a surface of the molding tool, said surface configured to be flush with the component being manufactured.

* * * * *